United States Patent [19]

Theodorides

[11] Patent Number: 5,090,653
[45] Date of Patent: Feb. 25, 1992

[54] FENDER WASHER

[76] Inventor: Panos Theodorides, 82 Lynnfield St., Hollbrook, Mass. 02343

[21] Appl. No.: 620,552

[22] Filed: Dec. 3, 1990

[51] Int. Cl.⁵ ............................................. A47H 1/10
[52] U.S. Cl. .................................. 248/317; 248/300; 248/342
[58] Field of Search ............... 248/317, 339, 342, 343, 248/690, 205.1, 237, 300, 301, 216.1, 216.4; 411/545, 544, 531; 405/259

[56] References Cited

U.S. PATENT DOCUMENTS

| | | | |
|---|---|---|---|
| 2,854,824 | 10/1958 | Curry et al. | 405/259 |
| 4,112,693 | 9/1978 | Collin et al. | 405/DIG. 1 |
| 4,315,611 | 2/1982 | Hoop | 248/317 X |
| 4,500,237 | 2/1985 | Pliml, Jr. | 411/544 X |

FOREIGN PATENT DOCUMENTS 2108257 5/1983 United Kingdom ............... 248/343

Primary Examiner—Ramon O. Ramirez
Attorney, Agent, or Firm—Wolf, Greenfield & Sacks

[57] ABSTRACT

A fender washer comprising a circular metal plate having a circumferential edge and a major portion thereof disposed in a flat plane. An opening as its center receives a screw or other fastener for securing the fender washer to support. A slit extends through the plate and is spaced from the edge, and the portion of the plate between the slit and edge is displaced from the plane of the major portion to form a hanger in the plate.

5 Claims, 3 Drawing Sheets

FENDER WASHER

This invention relates to the fender washers and more particularly comprises a new and improved fender washer that has a hanger incorporated into it.

The fender washer of this invention can be manufactured for essentially the same costs as convention washer but has greatly increased utility. In addition to performing all the conventional fender washer functions, the present invention also can be used for such purposes as a tie anchor for bundled wire conductors, a ceiling support for chain carried fixtures, etc. It has a hanger incorporated into it and about which a wire may be tied and in turn carry electrical equipment.

Prior art patents of which applicant is that aware bears some relationship to the present invention are U.S. Pat. Nos. 3,929,311; 1,462,671; 2,730,831; 4,655,423; and 4,490,855. However, none of these prior patents shows a fender washer or other fastener that can perform all conventional fender washer functions and at the same time perform anchoring functions without modification and without increased cost. The '815 patent shows a support plate for mines, etc. with a hanger, but the plate is much too larger to serve as a fender washer. The '423 patent describes a molded plastic fastener that is much more costly to manufacture than the present invention and could not serve as a fender washer. The '381 patent shows a reducing washer that is not designed to be screw mounted and is much larger than a fender washer. The '671 patent shows a cable clamp that is more expensive than applicant s washer and is not suitable to serve as a hanger for wire connected cables, fixtures, etc. The '311 patent shows a picture hook that has a hanger defined by a tab bent out of the edge of the washer shaped body. The tab does not have the strength and stiffness to perform the heavy duty functions of the hanger of the present invention.

The fender washer of this invention is made from sheet metal such as iron and may be approximately 1¼ inch in diameter and 1/16 inch thick. The body is round and has a small hole at its center for receiving a screw to fasten the washer to a wall, ceiling or other surface. A strip defined on one side by the washer edge and a slit on the other side is bent out of the plane of the body to form a hanger about which wire ma be bound to hang any desired electrical device such as a bundle of conductors or a chain supported fixture.

The invention will be better understood and appreciated from the following detailed description of one embodiment thereof, selected for purposes of illustration and shown in the accompanying drawing.

BRIEF FIGURE DESCRIPTION

DETAILED DESCRIPTION

Figure 4:
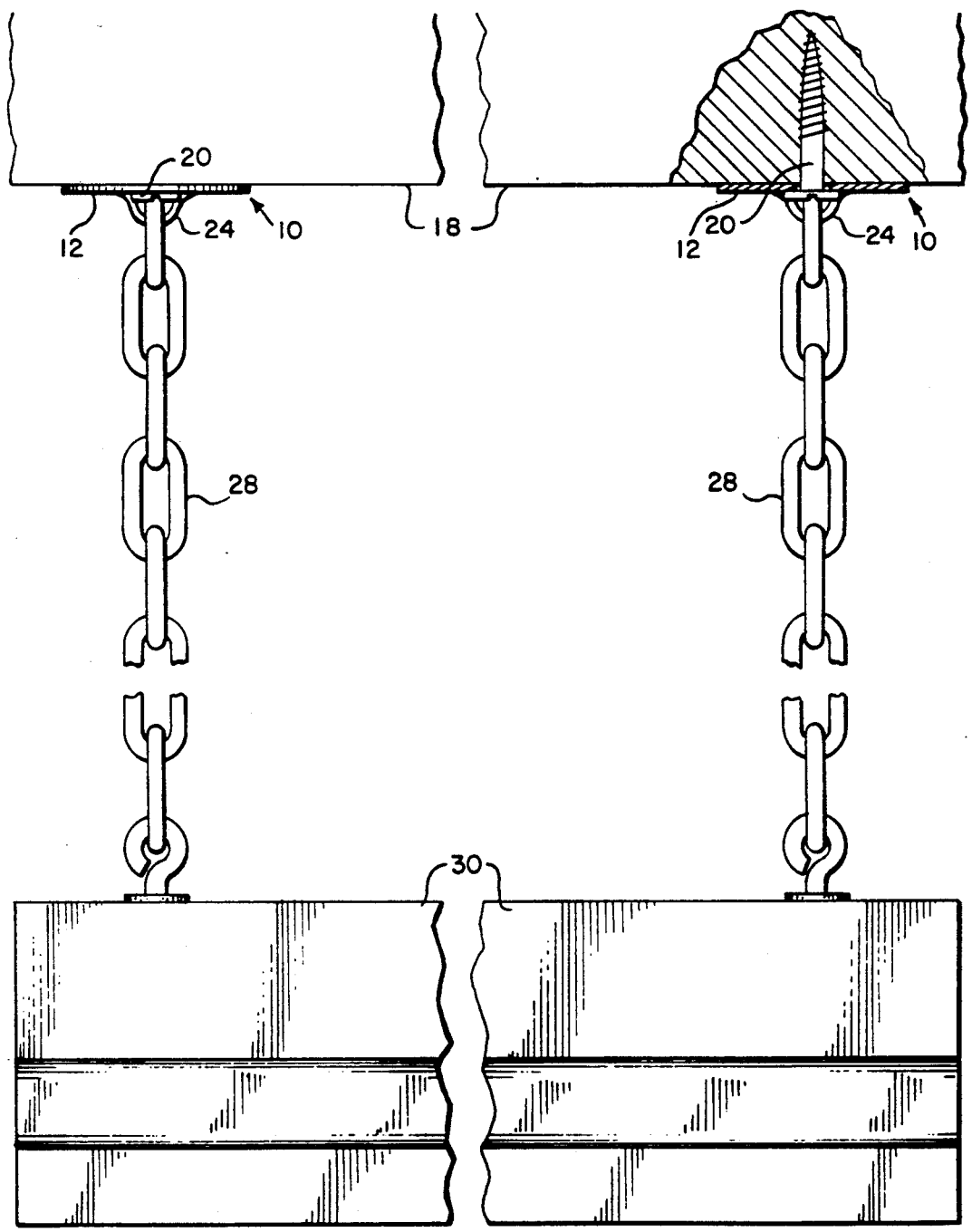
FIGS. 4 and 5 are perspective views showing two applications of the invention.

The fender washer 10 shown in the drawing is stamped from sheet metal and typically is 1/16 inch thick and 1¼ inches in diameter. The washer is a circular disk 12 having a peripheral edge 14 and an opening 16 at the center. The opening 16 is sized to receive a screw by which the washer may be attached to any supporting structure. In FIG. 4, two such washers 10 are shown screwed into a ceiling 18 by screws 20 that extend through the openings 18 at the center of each washer.

Figure 1:
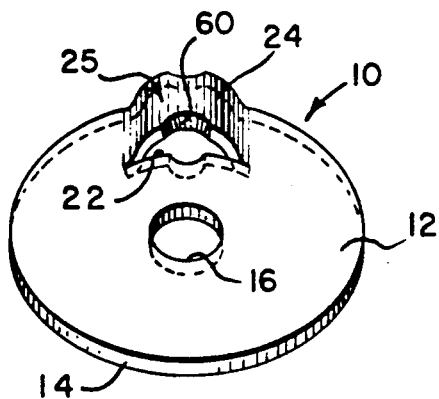
FIG. 1 is a perspective view of a fender washer constructed in accordance with this invention.
Figure 3:
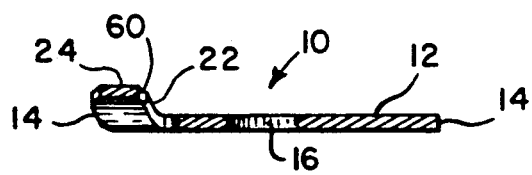
FIG. 3 is a cross sectional view thereof taken along the section line 3—3 in FIG. 2.
Figure 5:
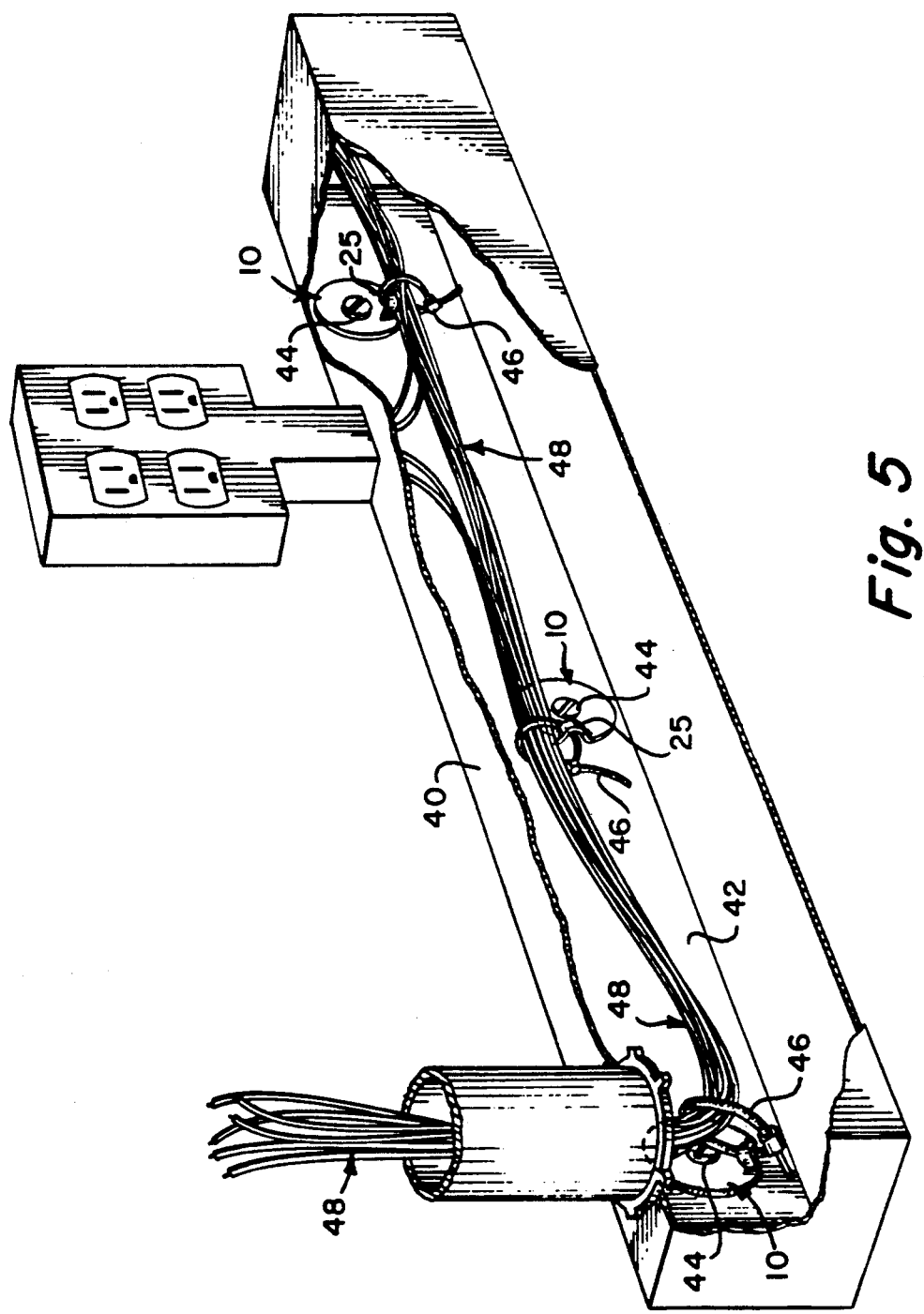

A slit 22 is cut in the body 12 of the washer and lies between the peripheral edge 14 and the opening 16 but intersects neither. The slit and edge 14 together define a strip 24 that forms a hanger. In accordance with the present invention, the strip 24 is displaced from the main plane of the body 12 as shown in FIGS. 1 and 3 so as to define a hanger 25 which may be used by electricians for any number of different purposes. The slit 22 may be curved so as to parallel the edge 14 or it may be straight or some other shape so long as the strip 22 has sufficient width to perform its intended hanger function. For example, the hanger of each washer defined by the strip 24 is shown in FIG. 4 to support a chain 28 which in turn carries a hanging light fixture 30. In FIG. 5, several washers are shown as they may be used in a metal wire trough 40 screwed to the rear wall 42 thereof by screws 44. The washers 10 and their screws 20 may serve to mount the trough 40 on a wall or ceiling. The hanger 25 formed in each washer is engaged by a wire 46 that wraps a bundle of electrical conductors 48 together so as to bind them as a bundle in the trough. In FIG. 5, a number of such fender washers are shown, all of the same construction and all performing the same function. It will be noted that each is screwed to the rear wall and a wire is threaded through each hanger looped under the strip 24 and through the slot 22, and the wires are wrapped around the conductor bundle 48.

Figure 2:
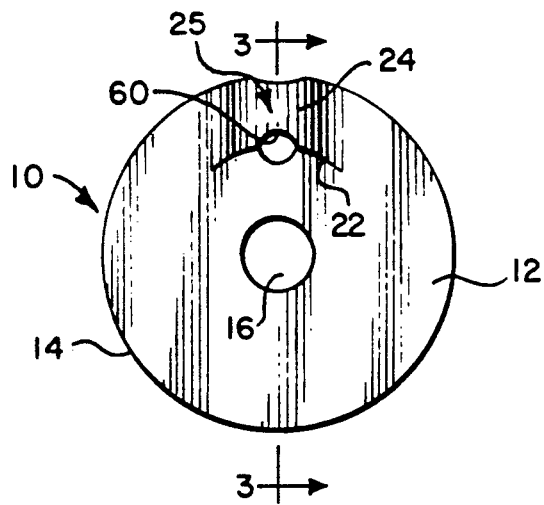
FIG. 2 is a top view thereof.

In accordance with the preferred embodiment of this invention, a notch 60 is formed on one side of the slit 22 and extends into the strip 24 as shown in FIG. 2. The notch 60 serves several functions. For example, it widens the slit 22 so as to make it easier to thread wire or other type of fastener under the strip 24. Second, it will stabilize any device that is secured by wire to it by preventing the wire bound about the strip 24 from sliding in either direction from the notch 60.

From the foregoing description, it will be appreciated that the fender washer of the present invention is a very convenient fastener for use by electricians. The device may serve not only as a conventional washer in mounting outlet boxes, trough, etc., but the hanger enables it to be engaged by wire, chains, or other material so as to support any piece of electrical equipment.

Having described this invention in detail, those skilled in the art will appreciate that numerous modifications may be made thereof without departing from the spirit of this invention. Therefore, I do not intend to limit the breadth of this invention to the single embodiment illustrated and described. Rather, it is intended that the scope of this invention be determined by the appended claims and their equivalents.

I claim:

1. A fender washer comprising
an annular flat metal disk having a central opening therethrough to receive a screw for securing the washer to a support, and a hanger formed in the disk by separating a strip-shaped portion thereof from the reminder of the disk along the sides of the strip shaped portion while leaving the ends of said portion integral with the disk and displacing said portion from the plane of the disk.

2. A fender washer comprising
a circular flat metal plate having a circumferential edge and with an opening therethrough as its center for receiving a screw for securing the fender washer to a support and a slit extending through the plate and free of any intersection with the opening or edge, said slit lying closely adjacent the circumferential edge and along a short length thereof, said slit and adjacent edge forming a short strip, said short strip being displaced from the plane of the plate to form a hanger in the plate.

3. A fender washer as defined in claim 2 wherein said slit is arcuate and concentric with the circumferential edge.

4. A fender washer as defined in claim 2 wherein the slit is notched intermediate its ends.

5. A fender washer as defined in claim 4 wherein the notch is on the side of the slit nearer to the edge of the washer.

* * * * *